US011411604B2

(12) United States Patent
Fung et al.

(10) Patent No.: US 11,411,604 B2
(45) Date of Patent: Aug. 9, 2022

(54) NOISE MITIGATION IN AN AUTOMOTIVE ETHERNET NETWORK

(71) Applicant: Marvell Asia Pte Ltd, Singapore (SG)

(72) Inventors: Hon Wai Fung, Newark, CA (US); Dance Wu, Palo Alto, CA (US); Christopher Mash, Harpenden (GB)

(73) Assignee: MARVELL ASIA PTE LTD, Singapore (SG)

( * ) Notice: Subject to any disclaimer, the term of this patent is extended or adjusted under 35 U.S.C. 154(b) by 0 days.

(21) Appl. No.: 17/194,351

(22) Filed: Mar. 8, 2021

(65) Prior Publication Data

US 2021/0281289 A1 Sep. 9, 2021

Related U.S. Application Data

(60) Provisional application No. 62/987,204, filed on Mar. 9, 2020.

(51) Int. Cl.
H04B 3/32 (2006.01)
H04L 12/10 (2006.01)
H04L 12/40 (2006.01)

(52) U.S. Cl.
CPC ............ H04B 3/32 (2013.01); H04L 12/10 (2013.01); H04L 12/40032 (2013.01); H04L 12/40045 (2013.01); H04L 2012/40273 (2013.01)

(58) Field of Classification Search
CPC ............ H04L 12/10; H04L 12/40045; H04L 12/40032; H04L 2012/40273; H04B 3/32
See application file for complete search history.

(56) References Cited

U.S. PATENT DOCUMENTS 6,733,452 B2 * 5/2004 Bae ............... G01S 7/52071
600/443
8,358,995 B2 * 1/2013 Patel ............... H04B 15/025
455/297

(Continued)

FOREIGN PATENT DOCUMENTS

WO 2015041699 A1 3/2015

OTHER PUBLICATIONS

Mortazavi et al., "Characterization and verification of Gigabit ethernet-based bus systems in vehicles", 2018 IEEE International Symposium on Electromagnetic Compatibility and 2018 IEEE Asia-Pacific Symposium on Electromagnetic Compatibility (EMC/APEMC), pp. 428-433, Singapore, year 2018.

(Continued)

Primary Examiner — Rasheed Gidado

(57) ABSTRACT

An automotive Ethernet physical-layer (PHY) transceiver includes an analog Front End (FE) and a digital processor. The FE is configured to receive an analog Ethernet signal over a physical Ethernet link while the Ethernet PHY transceiver is operating in a vehicle, and to convert the received analog Ethernet signal into a digital signal. The digital processor is configured to hold one or more noise profiles that characterize respective predefined noise types of noise signals that are expected to corrupt the received analog Ethernet signal, to classify an actual noise signal present in the digital signal into one of the noise types, using the noise profiles, and in response to deciding that the actual noise signal matches a given noise type among the predefined noise types, to apply a noise mitigation operation selected responsively to the given noise type.

24 Claims, 4 Drawing Sheets

(56) References Cited

U.S. PATENT DOCUMENTS

| | | | | |
|---|---|---|---|---|
| 9,184,878 | B2* | 11/2015 | Jin | H04N 7/173 |
| 10,446,170 | B1* | 10/2019 | Chen | G10L 21/0208 |
| 2002/0150154 | A1* | 10/2002 | Warke | H04L 27/2647 |
| | | | | 375/222 |
| 2009/0154727 | A1* | 6/2009 | Patel | H04B 15/025 |
| | | | | 381/94.1 |
| 2017/0134149 | A1* | 5/2017 | Chini | H04L 12/4035 |
| 2018/0253830 | A1* | 9/2018 | Courtney | G01R 33/5608 |
| 2019/0305820 | A1 | 10/2019 | Barzegar et al. | |
| 2020/0044896 | A1* | 2/2020 | Chini | H04L 25/03057 |

OTHER PUBLICATIONS

International Application # PCT/IB2021/051907 Search Report dated May 21, 2021.
IEEE Std 802.3bw-2015, IEEE Standard for Ethernet, "Amendment 1: Physical Layer Specifications and Management Paramenters for 100 Mb/s Operation over a Single Balanced Twisted Pair Cable (100BASE-T1)," IEEE Computer Society, pp. 1-88, Mar. 8, 2016.

\* cited by examiner

NOISE MITIGATION IN AN AUTOMOTIVE ETHERNET NETWORK

CROSS-REFERENCE TO RELATED APPLICATIONS

This application claims the benefit of U.S. Provisional Patent Application 62/987,204, filed Mar. 9, 2020, whose disclosure is incorporated herein by reference.

FIELD OF THE DISCLOSURE

The present disclosure relates generally to communication systems, and particularly to methods and systems for noise mitigation in Ethernet transceivers.

BACKGROUND

Various applications, such as automotive in-car communication systems, certain industrial communication systems and smart-home systems, require communication at high data rates over relatively small distances. Several types of protocols and communication media have been proposed for such applications. For example, Ethernet communication over twisted-pair copper wire media is specified in "IEEE 802.3bw-2015—IEEE Standard for Ethernet Amendment 1: Physical Layer Specifications and Management Parameters for 100 Mb/s Operation over a Single Balanced Twisted Pair Cable (100BASE-T1)," March, 2015.

The description above is presented as a general overview of related art in this field and should not be construed as an admission that any of the information it contains constitutes prior art against the present patent application.

SUMMARY

An embodiment that is described herein provides an automotive Ethernet physical-layer (PHY) transceiver that includes an analog Front End (FE) and a digital processor. The FE is configured to receive an analog Ethernet signal over a physical Ethernet link while the Ethernet PHY transceiver is operating in a vehicle, and to convert the received analog Ethernet signal into a digital signal. The digital processor is configured to hold one or more noise profiles that characterize respective predefined noise types of noise signals that are expected to corrupt the received analog Ethernet signal, to classify an actual noise signal present in the digital signal into one of the noise types, using the noise profiles, and in response to deciding that the actual noise signal matches a given noise type among the predefined noise types, to apply a noise mitigation operation selected responsively to the given noise type.

In some embodiments, the actual noise signal includes a transient noise signal, and the digital processor is configured to detect an onset event of the transient noise signal, and to classify the transient noise signal in the digital signal starting from the onset event. In other embodiments, in response to deciding that the actual noise signal matches the given noise type, the digital processor is configured to adjust the noise profile associated with the given noise type based on the actual noise signal. In yet other embodiments, the digital processor is configured to measure a quality of the digital signal, and to apply the noise mitigation operation by reconfiguring operation of one or both of the analog FE and the digital processor, based on the given noise type and on the measured quality.

In an embodiment, the digital processor is configured to apply the noise mitigation operation by reconfiguring one or more of a frequency response of a filter, a gain parameter and a clock rate, in one or both of the analog FE and the digital processor. In another embodiment, the digital processor is configured to generate, based on the digital signal, a sequence of multiple two-dimensional data structures, each two-dimensional data structure including multiple frequency domain vectors derived from multiple time-samples of the digital signal, and to classify the noise signal by applying a machine-learning model to the sequence of the two-dimensional data structures. In yet another embodiment, the digital processor is configured to specify, in the noise profiles, one or more characteristics selected from a list including: a source of the noise signal, a frequency pattern of the noise signal, time progression characteristics of the noise signal and a signal strength of the noise signal.

In some embodiments, the digital processor is configured to obtain one or more of the noise profiles directly from another vehicle, or by accessing a cloud storage that shares noise profiles of noise types among multiple vehicles. In other embodiments, the automotive Ethernet PHY transceiver belongs to a plurality of interconnected automotive Ethernet PHY transceivers in the vehicle, and the digital processor is configured to hold a noise profile that is not used by at least another Ethernet PHY transceiver in the plurality of the automotive Ethernet PHY transceivers. In yet other embodiments, the analog FE is configured to receive, in the actual noise signal, Electromagnetic Interference (EMI) caused by one or more of an electronic component of the vehicle, a mechanical component of the vehicle, an electromechanical component of the vehicle, and an electromagnetic radiation source external to the vehicle.

In an embodiment, the digital processor is configured to, based at least on an expected decay attribute of the actual noise signal determined from the noise type classification: i) apply the noise mitigation operation for a predetermined period of time, and ii) modify the noise mitigation operation during the predetermined period of time.

There is additionally provided, in accordance with an embodiment that is described herein, a method for communication including receiving an analog Ethernet signal over a physical Ethernet link while the Ethernet PHY transceiver is operating in a vehicle. The received analog Ethernet signal is converted into a digital signal. One or more noise profiles that characterize respective predefined noise types of noise signals that are expected to corrupt the received analog Ethernet signal are held. An actual noise signal present in the digital signal is classified into one of the noise types, using the noise profiles. In response to deciding that the actual noise signal matches a given noise type among the predefined noise types, a noise mitigation operation selected responsively to the given noise type is applied.

There is additionally provided, in accordance with an embodiment that is described herein, an automotive system that includes a central processor and an Ethernet network. The central processor is configured to be installed in a vehicle. The Ethernet network includes a plurality of automotive Ethernet physical-layer (PHY) transceivers configured to connect the central processor and the peripheral devices in the vehicle using physical Ethernet links. Each of the Ethernet PHY transceivers includes an analog Front End (FE) and a digital processor. The FE is configured to receive an analog Ethernet signal over a physical Ethernet link, and to convert the received analog Ethernet signal into a digital signal. The digital processor is configured to hold one or more noise profiles that characterize respective predefined noise types of noise signals that are expected to corrupt the received analog Ethernet signal, to classify an actual noise signal present in the digital signal into one of the noise types, using the noise profiles, and in response to deciding that the actual noise signal matches a given noise type among the predefined noise types, to apply a noise mitigation operation selected responsively to the given noise type.

In some embodiments, the digital processor is configured to hold a noise profile that is not used by at least another Ethernet PHY transceiver in the plurality of the automotive Ethernet PHY transceivers. In other embodiments, the central processor is configured to perform at least part of a task of classifying the actual noise signal, on behalf of the digital processor.

There is additionally provided, in accordance with an embodiment that is described herein, a method for communication, including, in an automotive system that includes a central processor installed in a vehicle, and an Ethernet network that includes a plurality of automotive Ethernet physical-layer (PHY) transceivers that connect the central processor and the peripheral devices in the vehicle using physical Ethernet links, including a given PHY transceiver, receiving by the given PHY transceiver an analog Ethernet signal over a physical Ethernet link. The received analog Ethernet signal as converted into a digital signal. One or more noise profiles that characterize respective predefined noise types of noise signals that are expected to corrupt the received analog Ethernet signal are held by a digital processor of the PHY transceiver. An actual noise signal present in the digital signal is classified into one of the noise types, using the noise profiles. In response to deciding that the actual noise signal matches a given noise type among the predefined noise types, a noise mitigation operation selected responsively to the given noise type is applied.

The present disclosure will be more fully understood from the following detailed description of the embodiments thereof, taken together with the drawings in which:

DETAILED DESCRIPTION OF EMBODIMENTS

Figure 1:
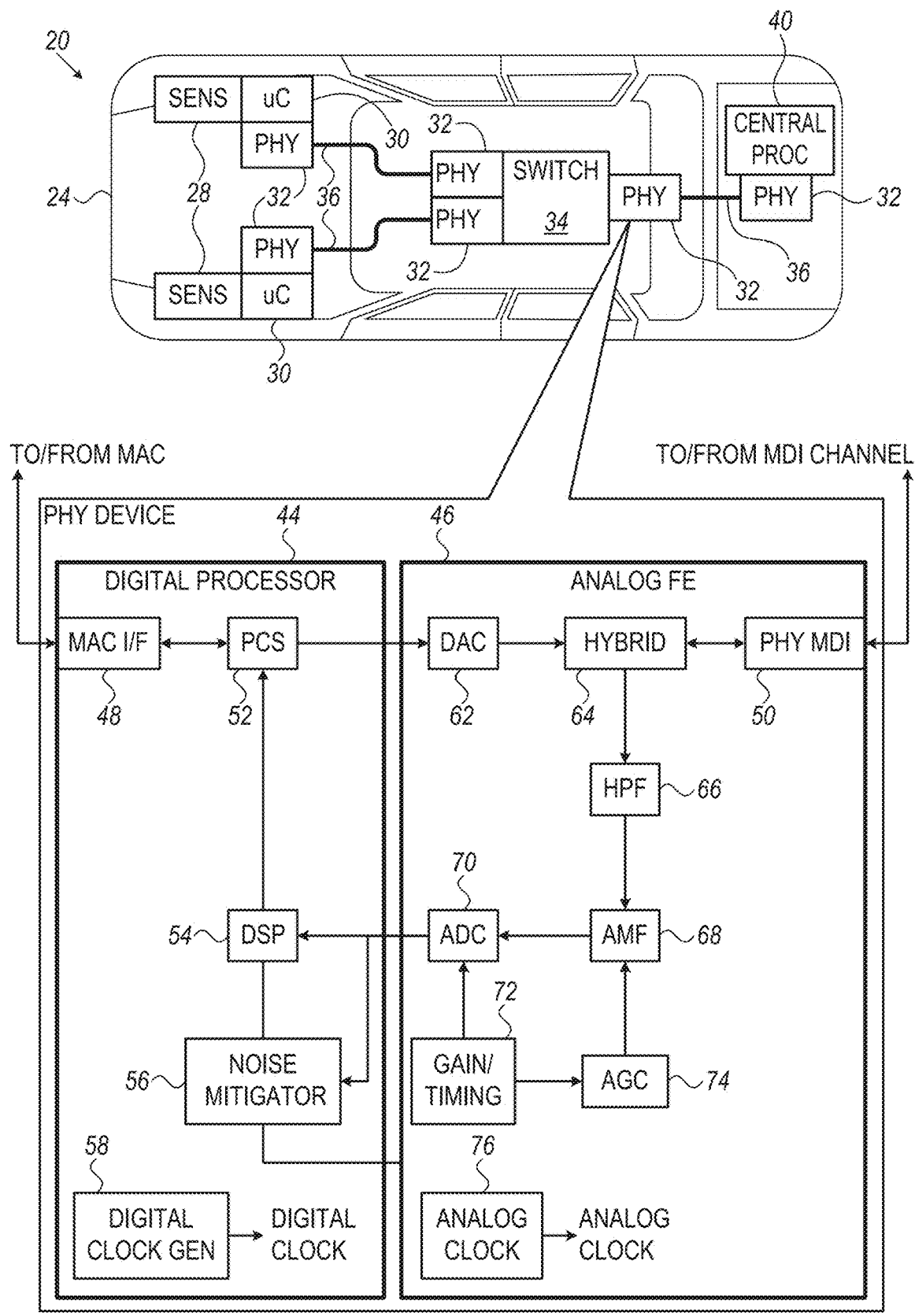
FIG. 1 is a block diagram that schematically illustrates an automotive communication system, in accordance with an embodiment that is described herein.

Embodiments that are described herein provide improved methods and systems for noise mitigation in physical-layer (PHY) interfaces of Ethernet links. The embodiments described herein are described in the context of automotive applications, e.g., systems that collect data from sensors within a vehicle. This choice, however, is made solely for the sake of clarity. The disclosed techniques are equally applicable in other applications, for example in industrial and/or smart-home networks.

In some embodiments, an automotive communication system comprises a central processor and multiple sensors, which are connected to one another by an Ethernet network. In an example network implementation, the central processor and the sensors are connected via physical Ethernet links to respective ports of an Ethernet switch. The central processor and each of the sensors is connected to an Ethernet link via an Ethernet MAC device coupled to an Ethernet PHY device. An Ethernet PHY device is also referred to as an Ethernet PHY transceiver or simply Ethernet transceiver, for brevity. The sensors fitted in the vehicle comprise, e.g., cameras, radar sensors and the like. By communicating over the Ethernet links, the PHY devices transfer data collected by the sensors to the central processor, and transfer control information from the central processor to the sensors.

A Vehicle Ethernet network is typically required to deliver large amounts of data at high-speeds and low latencies, under extreme environmental conditions. On the other hand, in-vehicle communication should be highly reliable, e.g., for safety reasons. Electronic components within the vehicle may be subjected to Electromagnetic Interference (EMI) from various sources, which may corrupt electrical signals, such as signals carrying data over Ethernet links leading to communication errors and system malfunction.

Sources of EMI may reside within a vehicle or externally to the vehicle. Example external EMI sources include, for example, radio towers, electric power transition lines and airport radar, and many others. Example EMI sources that are internal to the vehicle include, for example, the vehicle engine and other mechanical and electromechanical components, the windshield wipers, mobile phones, an infotainment system, and the like.

In principle, noise created by EMI may be mitigated using Electromagnetic compatibility (EMC) approaches that aim to achieve correct operation of underlying equipment in a common electromagnetic environment. In a vehicle Ethernet network, however, EMC typically is insufficient and residual EMI still must be handled by the PHY device. Moreover, it is desirable that EMI mitigation would be able to adapt to various types of interference that may be encountered in the field, as well as future types of interference that cannot be characterized in advance.

One challenge in EMI mitigation in a vehicle environment is the detection and elimination of transient noise signals, with minimal impact on communication throughput and latency. In the present context, a transient noise signal comprises one or more pulses, each of which consisting of a short-duration high-amplitude pulse followed by decaying low frequency oscillations.

In some embodiments, an automotive Ethernet physical-layer (PHY) transceiver comprises an analog Front End (FE) and a digital processor. The analog FE is configured to receive an analog Ethernet signal over a physical Ethernet link while the Ethernet PHY transceiver is operating in a vehicle, and to convert the received analog Ethernet signal into a digital signal. The digital processor is configured to hold one or more noise profiles that characterize respective predefined noise types of noise signals that may be found and that would be expected to corrupt the received analog Ethernet signal, to classify an actual noise signal present in the digital signal into one of the noise types, using the noise profiles, and in response to deciding that the actual noise signal matches a given noise type among the predefined nose types, to apply a noise mitigation operation selected responsively to the given noise type.

As noted above, the actual noise signal may comprise a transient noise signal. In an embodiment, in mitigating a transient noise signal, the digital processor is configured to detect an onset event of the transient noise signal, and to classify the transient noise signal in the digital signal starting from the onset event.

The characteristics of the actual noise signal typically somewhat deviate from the characteristics specified in the matching noise profile, i.e., the noise signal may be classified into the closest noise type even with inexact match. In some embodiments, in response to deciding that the actual noise signal matches the given noise type (exactly or closely), the digital processor adapts the profile of the matching noise type based on the actual noise signal. This may improve classification performance in subsequent classification operations.

In some embodiments, the digital processor is configured to measure a quality of the digital signal, and to apply the noise mitigation operation by reconfiguring operation of one or both of the analog FE and the digital processor, based on the given noise type and on the measured quality. The noise mitigation operation may comprise, for example, reconfiguring one or more of a frequency response of a filter, a gain parameter and a clock rate in the analog FE, the digital processor or both.

In some embodiments, classifying the noise signal is based on machine-learning methods. In such embodiments, the digital processor is configured to generate, based on the digital signal, a sequence of multiple two-dimensional data structures, each data structure comprising multiple frequency-domain vectors derived from multiple time-samples of the digital signal. The digital processor classifies the noise signal by applying a Convolutional Neural Network (CNN) machine-learning model to the sequence of two-dimensional data structures. Alternatively, any other suitable machine-learning model can also be used.

As noted above, each noise type has a corresponding noise profile comprising one or more characteristics. The characteristics may comprise, for example, one or more of a source of the noise signal, a frequency pattern of the noise signal, time progression characteristics of the noise signal and a signal strength of the noise signal, or other suitable characteristics, in an embodiment. A vehicle may efficiently share one or more noise profiles with other vehicles in its vicinity, e.g., using cloud services. Alternatively or additionally, the vehicle supports direct vehicle-to-vehicle data transfer (e.g., using wireless communication) for sharing the noise profiles and other data, in an embodiment.

A vehicle typically comprises multiple PHY devices. Different PHY devices, however, may be subjected to different types of EMI, depending, e.g., on the location of the PHY device within the vehicle. In some embodiments, different PHY devices may hold different sets of noise profiles, in accordance with the noise types expected.

In some embodiments, the digital processor is configured to, based at least on an expected decay attribute of the actual noise signal determined from the noise type classification: i) apply the noise mitigation operation for a predetermined period of time, and ii) modify the noise mitigation operation during the predetermined period of time.

In the disclosed techniques, a PHY device holds noise profiles that characterize expected types of noise signals, including transient noise signals. In response to detecting the presence of a noise signal in a desired signal, the noise signal is classified into a corresponding noise type using the noise profiles, and a suitable noise mitigation operation is applied. Noise profiles of expected noise types are trained and used for classification, e.g., using machine-learning models. The predefined noise profiles are adaptable to actual noise types that are encountered in the field. Moreover, the addition of future noise profiles requires no design or implementation modification.

FIG. 1 is a block diagram that schematically illustrates an automotive communication system 20, in accordance with an embodiment that is described herein. Communication system 20 is installed in a vehicle 24, and comprises multiple sensors 28, multiple microcontrollers 30, multiple Ethernet physical layer (PHY) devices 32 (also referred to as Ethernet transceivers), and an Ethernet switch 34. The PHY devices 32 and switch 34 are interconnected by point-to-point physical Ethernet links 36. Among other components, switch 34 comprises a MAC device (not shown) that is coupled to one or more PHY devices 32. Typically, the MAC device of switch 34 is duplicated per port of switch 34, i.e., per PHY device 32 coupled to the switch.

In various embodiments, sensors 28 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like.

PHY devices 32 typically operate at least partially in accordance with one or more of the IEEE 802.3 Ethernet standards, e.g., the IEEE 802.3bw-2015, cited above. Although the techniques described herein pertain mainly to the physical layer, PHY devices 32 may also perform Medium Access Control (MAC) functions as well, in an embodiment.

Depending on the applicable Ethernet standard, links 36 may comprise any suitable physical medium. In the embodiments described herein, although not necessarily, each link 36 comprises a single pair of wires, e.g., a single twisted-pair link that is optionally shielded. In alternative embodiments, links 36 may comprise single-ended wire links, not necessarily Ethernet compliant.

In the present example, each sensor 28 is connected to a respective microcontroller 30, which is in turn connected to a respective PHY device 32. The PHY device 32 of each sensor is connected by a link 36 to a peer PHY device 32 coupled to a port of switch 34. On the sensor side of a given link, microcontroller 30 serves as a Medium Access Control (MAC) controller. On the switch side of a given link, MAC functions are carried cut by switch 34. Switch 34 and microcontrollers 30 are thus also referred to herein as MAC devices, hosts or Systems-on-Chip (SoC). In some embodiments, the PHY circuitry and the circuitry that performs MAC functions (e.g., microcontroller or switch) are integrated in the same device. In the present example, a central processor 40 (on the right-hand side of the figure) is connected via switch 34 but is not connected directly to any sensor. Alternatively or additionally central processor 40 may connect directly, to one or more sensors (or to microcontrollers 30 of the sensors), in an embodiment.

The PHY devices 32, switch 34 and links 36 form an Ethernet network within vehicle 24. Using this vehicle Ethernet network, central processor 40 sends control messages to sensors 28, and receives information captured by the sensors. The topology of the Ethernet network depicted in FIG. 1 is given by way of example, and other suitable topologies can also be used, e.g., topologies that include more than one switch such as switch 34 and/or more than a single central processor 40.

An inset at the bottom of FIG. 1 shows the internal structure of a PHY device 32, in an embodiment. PHY device 32 comprises a digital processor 44 and an analog Front End (F) 46. In an embodiment, digital processor 44 comprises a MAC interface 48, which is configured to communicate with a MAC device, e.g., of switch 34, sensor 28, or central processor 40. Analog FE 46 comprises a PHY Media-Dependent Interface (MDI) 50, which is configured to transmit and receive analog Ethernet signals over an MDI channel comprising a physical link 36 (e.g., a twisted-pair link).

In the description that follows, the terms "transmit direction" and "receive direction" refer to PHY 32 respectively transmitting and receiving analog Ethernet signals to and an MDI channel via MDI 50.

In the transmit direction, digital processor 44 of PHY device 32 receives data in a digital form, via MAC interface 48. The data is processed by processor 44 and is further processed by analog FE 46 that produces an analog Ethernet signal carrying the data. The analog FE transmits the analog Ethernet signal via MDI 50. In the receive direction, analog FE 46 receives, via MDI 50, an analog Ethernet signal carrying data. The analog Ethernet signal is processed by analog FE 46 followed by digital processor 44 that recovers the data. The digital processor delivers the recovered data to a peer MAC device via MAC interface 48.

In an embodiment, digital processor 44 comprises a Physical Coding Sublayer (PCS) 52, which is configured to perform various digital data processing, such as data encoding and decoding and data scrambling and descrambling, to name a few.

Digital processor 44 further comprises a Digital Signal Processor (DSP) 54 serving mainly as a digital receiver that processes signals received from analog FE 46. Digital processor 44 comprises a noise mitigator 56, which is configured to detect the presence of noise in the received signal, to identify the noise type, and to adjust the operation of analog FE 46 and of the DSP depending on the noise type. Digital processor 44 comprises a digital clock generator 58, configured to generate a digital clock signal that is used by various components within the digital processor.

Analog FE 46 comprises a Digital to Analog Converter (DAC) 62, which is configured to receive data processed by PCS 52, and to convert the data to an analog Ethernet signal. A hybrid 64 is configured to separate between Ethernet signals in the transmit and receive directions. In the transmit direction, hybrid 64 transmits the analog Ethernet signal produced by DAC 62 via MDI 50. In the receive direction, hybrid 64 transfers an analog Ethernet signal carrying data, received via MDI 50, for processing through a reception path as described herein.

The reception path comprises an analog part comprising a High-Pass Filter (HPF) 66, an Analog Matched Filter (AMP) 68 and an Analog to Digital Converter (ADC) 70, and a digital part comprising DSP 54 and PCS 52. HPF filters the analog Ethernet signal to eliminate frequency content of the signal below a predefined cutoff frequency. The filtered signal passes through AMF 68 to ADC 70, which is configured to digitize the analog Ethernet signal into a sequence of digital samples that are provided to DSP 54.

AMP 68 is configured to compensate for Gaussian noise present in the signal, which is typically caused by the underlying channel. In some embodiments, applying the AMF is optional and may be omitted. A gain and timing component 72 controls the operation of ADC 70 and of an Automatic Gain. Control (AGC) component 74 for optimally adjusting the sampling rate and gain in ADD 70. Analog FE 46 comprises an analog clock generator 76, configured to generate an analog clock signal that is used by various components within analog FE 46. The digital part of the reception path comprises DSP 54 and PCS 52 that recover the data carried in the analog Ethernet signal.

Figure 2:
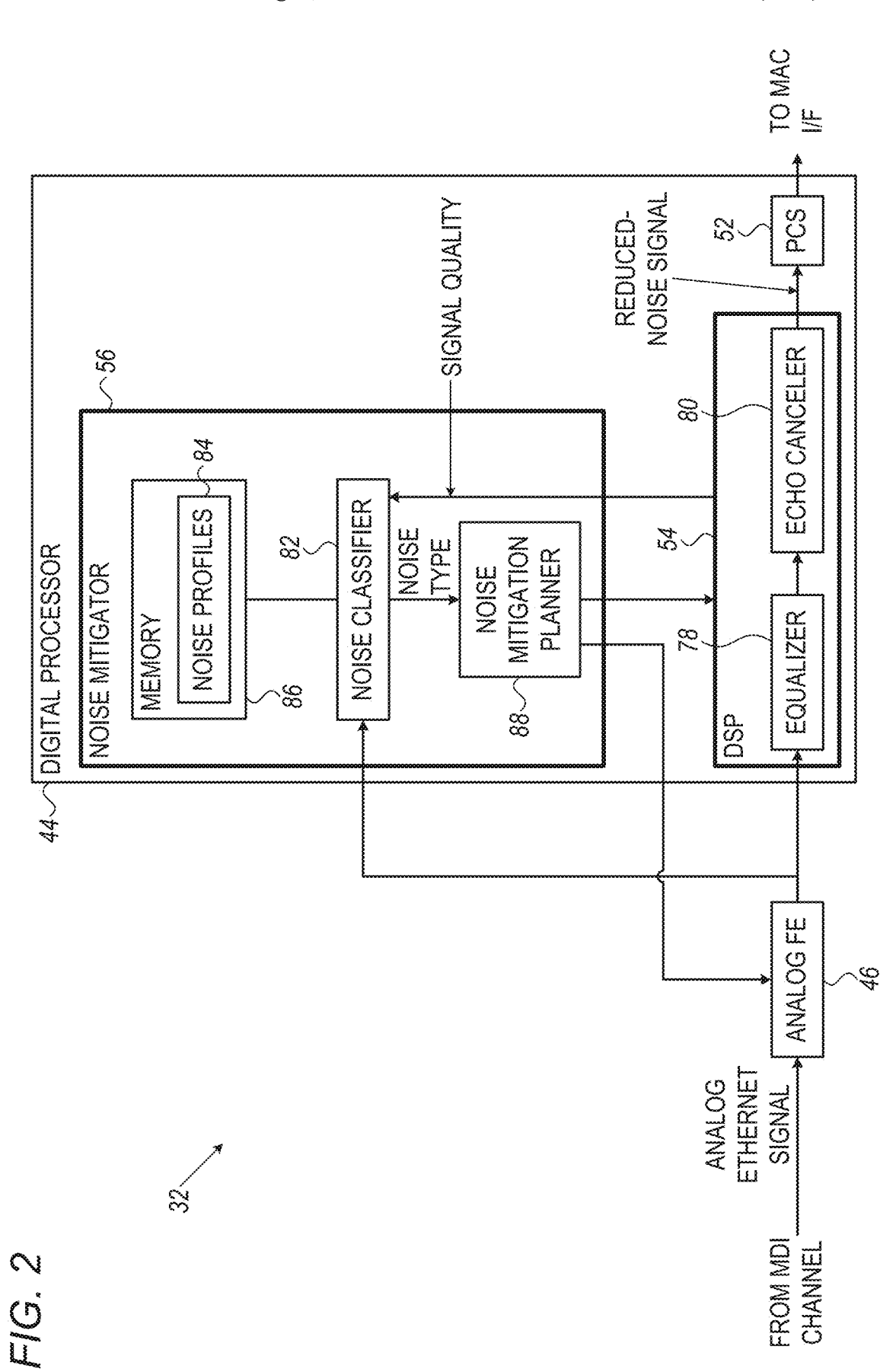
FIG. 2 is a block diagram that schematically illustrates components of a PHY device processing an analog Ethernet signal, in accordance with an embodiment that is described herein.

FIG. 2 is a block diagram that schematically illustrates components of PHY device 32 processing an analog Ethernet signal, in accordance with an embodiment that is described herein.

As explained above, PHY device 32 processes an Ethernet signal using analog FE 46, followed by digital processor 44. DSP 54 of the digital processor receives from ADC 70 a digitized version of the Ethernet signal possibly containing a noise signal. In some embodiments, the analog FE is configured to receive, in the noise signal, Electromagnetic Interference (EMI) caused by one or more sources such as, for example, an electronic component of the vehicle, a mechanical component of the vehicle, an electro-mechanical component of the vehicle, and an electromagnetic radiation source external to the vehicle.

DSP 54 comprises an equalizer 78 and an echo canceler 80. Equalizer 78 comprises any suitable type of an adaptive equalizer such as one or more of a Feed-Forward Equalizer (FFE), a Decision-Feedback Equalizer (DFE) or other suitable equalizer. Equalizer 78 as configured to reduce the effect of the underlying channel on the received signal. Echo canceler 80 is configured to reduce echo signals created, e.g., by reflections of the desired signal. The output of echo canceler 80 is provided to PCS 52.

In some embodiments, DSP 54 monitors the quality of the received signal (e.g., as described below) and detects that the quality has degraded below a predefined quality threshold. In an embodiment, DSP 54 monitors the signal quality by measuring the signal-to-noise (SNR) ratio, e.g., based on evaluating the opening of an eye-pattern of the received signal. In alternative embodiments, DSP 54 may use any other suitable methods for measuring the signal quality.

In some embodiments, noise mitigator 56 is configured to hold (e.g., in a memory 86) one or more noise profiles 84 that characterize respective predefined noise types of noise signals that are expected to be found in an operational environment and that may corrupt the analog Ethernet signal received. Each of the noise profiles specifies one or more characteristics of the noise signal such as, for example, a source of the noise signal, a frequency pattern of the noise signal, and a signal strength of the noise signal. Other noise characteristics may comprise, for example, the transition and time progression characteristics of the noise signal. Different noise types may be associated with respective noise profiles having the same or different set of characteristic parameters.

The noise mitigator comprises a noise classifier 82, which is configured to receive from analog FE 46 a digitized version of the analog Ethernet signal, detect an actual noise signal contained in the analog Ethernet signal, and classify the actual noise signal into a respective noise type that matches a given noise type among the predefined noise types. Note that the classification does not require exact matching. In other words, a noise signal may match a given noise type even when the characteristics of the nose signal deviate from those of the matching profile. In an embodiment, in response to deciding that the actual noise signal matches the given noise type (possibly inexact matching), the noise classifier is configured to adjust the noise profile associated with the given noise type based on the actual noise signal. This feature allows fine tuning of noise profiles to actual noise signals encountered in the field.

In some embodiments, the actual noise signal comprises a transient noise signal. In such embodiments, noise classifier 82 is configured to detect an onset event of the transient noise signal, and to classify the transient noise signal in the digital signal, starting from the onset event.

A noise mitigation planner 88 is configured to receive the noise type determined by noise classifier 82. Based on the noise type, noise mitigation planner 88 applies a suitable noise mitigation operation. In some embodiments, by classifying transient noise into noise types, the noise mitigation operation can be applied proactively for an anticipated duration of the transient noise, based on the classified noise type. In some noise mitigation operations, the noise mitigation operations can be modified and optimally applied over the anticipated lifetime of the noise signal, as determined based on the noise type classification.

For example, in an embodiment, the noise mitigator controls analog FE 46, DSP 54 or both, to adjust their operation to reduce or eliminate the noise signal. In some embodiments, the noise mitigation planner controls analog FE 46 to adjust one or more of: the impulse response (or the frequency response) of HPF 66, the gain of AGC 74, gain and timing 72, and the clock rate of analog clock generator 76. In some embodiments, the noise mitigation planner controls DSP 54 to adjust one or more of: a digital gain, the impulse response (or frequency response) of a filter implementing equalizer 78, the impulse response (or frequency response) of a filter implementing echo canceler 80, and the clock rate of digital clock generator 58.

In some embodiments, DSP 54 is configured to measure the quality of the digital signal as described above, e.g., at the output of equalizer 78, echo canceler 80 or both. In such embodiments, DSP 54 provides the measured quality to noise classifier 82, which uses the quality to enhance the classification performance. The measured quality may be used, for example, for reinforcement training on the noise classifier, to determine how well the current classified noise matches the actual noise observed. As another example, the measured quality provides the mitigation planner with additional feedback so as to refine the noise mitigation operation taken.

In some embodiments, for further enhancing classification performance, noise classifier 82 receives additional information such as, for example, the digitized Ethernet signal provided to DSP 54 and/or the processed signal output by DSP 54, after applying the noise mitigation operation.

Noise profiles 84 (or part of the noise profiles) are typically determined and stored in a memory 86 of the digital processor, prior to enabling noise mitigator 56. In some embodiments, the noise profiles are determined by training a suitable machine-leaning model with noise signals of the expected noise types. An example machine-leaning model that is applicable for noise type classification is the Convolutional Neural Network (CNN). Alternatively, other suitable machine-learning models can also be used.

In an embodiment, instead of or in addition to training a machine-leaning model for determining noise profiles 84, digital processor 44 is configured to obtain one or more of noise profiles 84 by accessing a cloud storage that shares noise profiles among multiple vehicles. In such embodiments, a vehicle that becomes aware of a relevant noise type may upload the corresponding noise profile to the cloud, so that the noise profile can be selectively shared with other vehicles in its vicinity, or in the vicinity of the noise source. Alternatively or additionally, the vehicle receives one or more noise profiles from another vehicle using direct data transfer communication, in an embodiment.

In some embodiments, PHY devices 32 in vehicle 24 use the same set of noise profiles 84. Such a configuration simplifies the training and distribution of noise profiles among the PHY devices. This, however, not mandatory, and in alterative embodiments, different PHY devices may use different sets of the noise profiles. This configuration may be useful, for example, when different PHY devices in the vehicle are subjected to different types of EMI or noise. For example, a PHY device that, is located close to the engine of the vehicle may be subjected to a noise type that may not be experienced by PHY devices located far away from the engine. In an example embodiment, a PHY device 32 holds a dedicated noise profile that is not used by at least one other PHY device in vehicle 24.

The task of classifying the noise signal into a corresponding noise type may be cumbersome. In some embodiments, e.g., in which central processor 40 is much more powerful than PHY devices 32, the central processor may assist in performing at least part of the task of classifying the actual noise signal, on behalf of digital processors 44 of one or more PHY devices. This may be applicable, for example, when a matched noise profile needs to be adjusted to better characterize the actual noise signal encountered. In some embodiments, the central processor retrieves noise signals observed by individual PHYs and performs noise classification based on the combined information to increase the reliability in classifying noise signal a that is experienced by the entire system or vehicle, as well as locally at each individual PHY.

The configurations of communication system 20 and its components, such the internal structure of PHY devices 32, as shown FIGS. 1 and 2, are example configurations that are depicted solely for the sake of clarity. In alternative embodiments, any other suitable configurations can be used. For example, the disclosed techniques can be used in any other suitable network or link topology, in a point-to-point Ethernet link between two hosts (e.g., microcontrollers) that does not traverse a switch at all. As another example, the disclosed techniques can be used in a point-to-point Ethernet link between two switches. Elements that are not mandatory for understanding of the disclosed techniques have been omitted from the figure for the sake of clarity.

The different elements of communication system 20 and its various components may be implemented using dedicated hardware or firmware, such as using hard-wired or programmable logic, e.g., in an Application-Specific Integrated Circuit (ASIC) or Field-Programmable Gate Array (FPGA). Additionally or alternatively, some functions, e.g., functions of digital processor 44 such as functions of DSP 54, may be implemented in software and/or using a combination of hardware and software elements.

In some embodiments, digital processor 44 comprises a programmable processor (e.g., DSP 54 or other suitable processor such as a vector processor), which is programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 3:
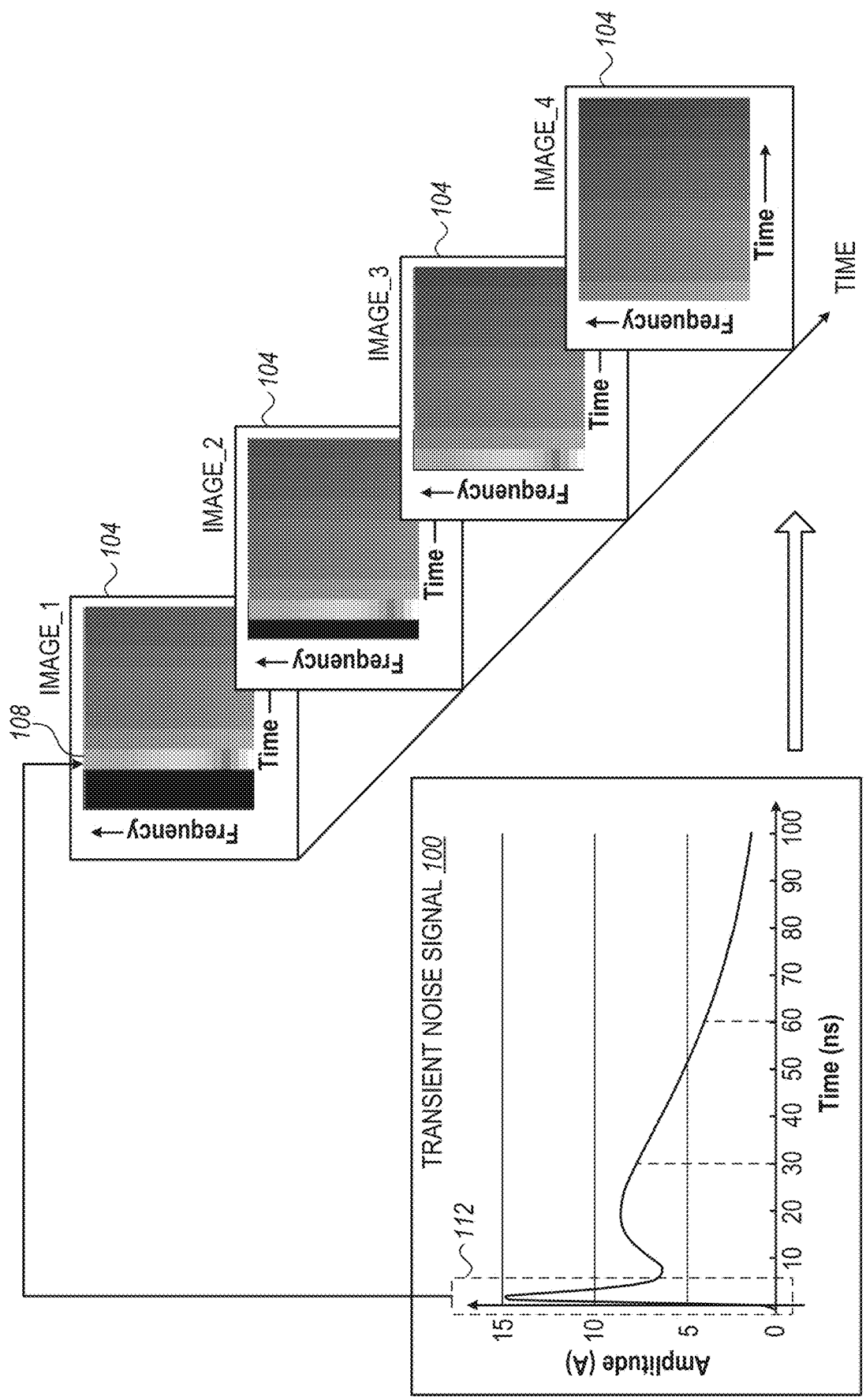
FIG. 3 is diagram that schematically illustrates multiple images produced from a transient noise signal for classification using a machine-learning model, in accordance with an embodiment that is described herein.

FIG. 3 is diagram that schematically illustrates multiple images produced from a transient noise signal for classification using a machine-learning model, in accordance with an embodiment that is described herein.

FIG. 3 depicts a transient noise signal 100, which may undesirably corrupt an analog Ethernet signal received in PHY device 32. As shown in the figure, the transient signal is typically characterized by an abrupt raising and a much slower decay. A transient noise signal of this sort may be created by various electro-mechanical or mechanical components within vehicle 24, or by noise sources external to the vehicle. Transient noise signal 100 is given by way of example. Alternatively, transient noise signals having other characteristics such as amplitude and shape, are also applicable.

In some embodiments, noise classifier 82 in PHY device 32 classifies the noise signal (e.g., 100) using a CNN model that was previously trained to create one or more noise profiles of corresponding noise types. In some embodiments, the CNN model classifies an input signal that is captured and converted into a sequence of two-dimensional data structures, also referred to as "images." In FIG. 3, four images 104 corresponding to transient noise signal 100 are depicted. In the example of FIG. 3, each image comprises multiple column vectors of pixels. In the present example, the pixels comprise real-valued numbers corresponding gray color levels in a predefined range and resolution. Alternatively, other types of pixels (e.g., colored pixels or complex-valued pixels can also be used). Column vectors in image 104 correspond to respective time segments of the signal. For example, column vector 108 corresponds to a time segment 112 of the transient noise signal.

Figure 4:
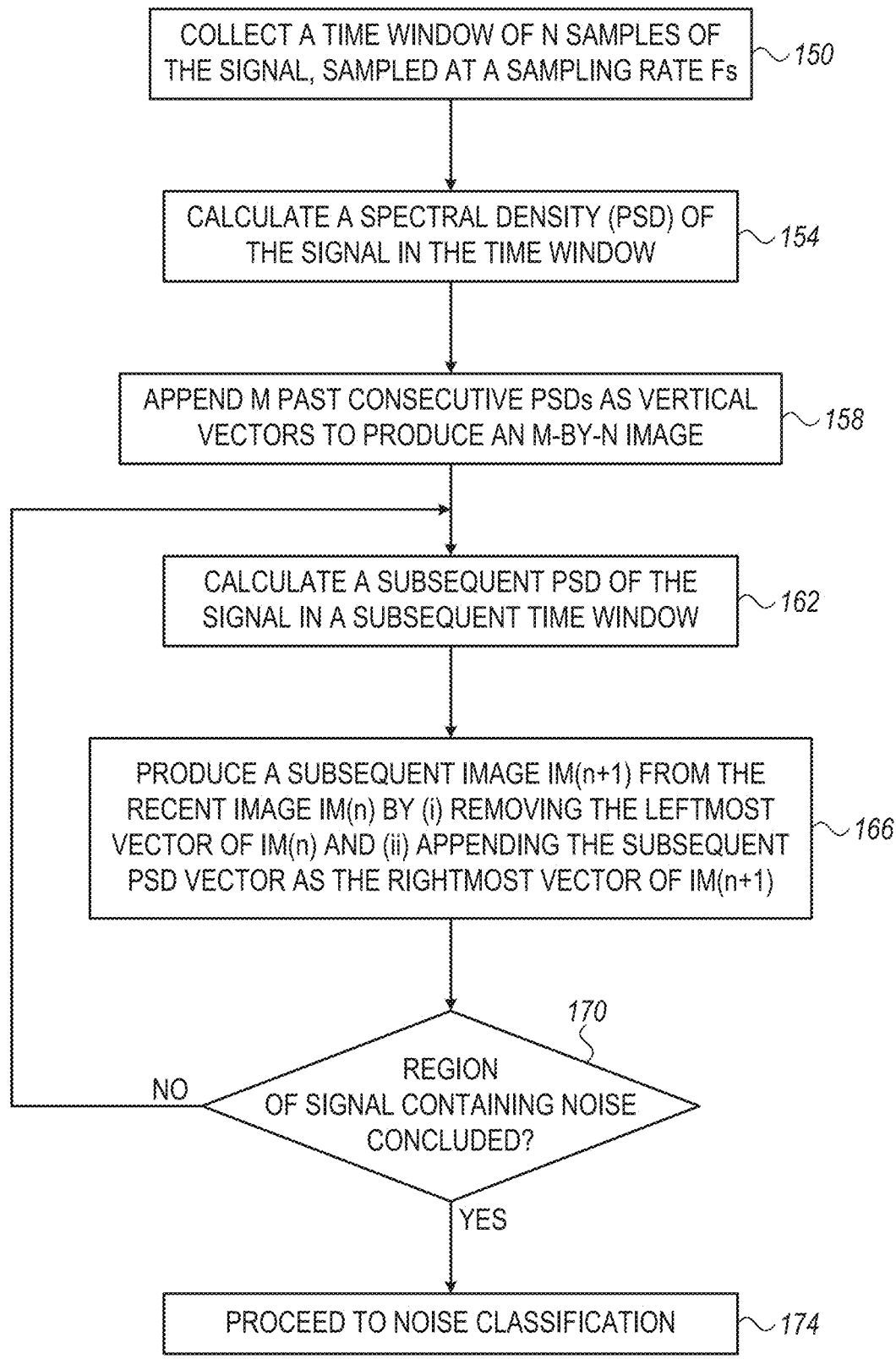
FIG. 4 is a flow chart that schematically illustrates a method for converting a signal into a sequence of images for noise classification, in accordance with an embodiment that is described herein.

FIG. 4 is a flow chart that schematically illustrates a method for converting a signal into a sequence of images for noise classification, in accordance with an embodiment that is described herein.

The method will be described as being executed by DSP 54 of digital processor 44. In some embodiments, digital processor 44 executes the method of FIG. 4 continuously, to assist in detecting an onset event of a noise signal, instead of being triggered by the DSP. The method may be initiated, for example, in response to detecting an onset event of a transient noise signal, in an embodiment.

The method begins with DSP 54 collecting a time window comprising N samples of the analog Ethernet signal, sampled at a suitable sampling rate Fs, at a window reception operation 150. The window size N and the sampling rate Fs are typically predefined design parameters. At a time-domain to frequency-domain conversion operation 154, DSP 54 calculates a Spectral Density (PSD) of the signal in the time window. The DSP may calculate the PSD, for example, by applying any suitable transform operation such as the Discrete Fourier Transform (DFT) to the samples in the time window. At an image generation operation 158, DSP 54 appends M consecutive past PSDs as column vectors to produce an M-by-N image. The pixels of the image are derived from PSD values in the appended M vectors.

At a next PSD calculation operation 162, DSP 54 calculates a subsequent PSD of the signal in a subsequent time window. Let IM(n) and IM(n+1) denote the recent and subsequent images, respectively. At a subsequent image generation operation 166, DPS 54 produces the IM(n+1) image based on the IM(n) image by (i) removing the leftmost vector from the IM(n) and (ii) appending the subsequent PSD vector as the rightmost vector of IM(n+1).

At a termination query operation 170, DSP 54 checks whether the region of the signal containing noise has concluded, and if not loops back to operation 162 to calculate a subsequent PSD. Otherwise, the current region of interest containing noise has concluded, and DSP 54 proceeds to applying noise classification, as described above.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An automotive Ethernet physical-layer (PHY) transceiver, comprising:
    an analog Front End (FE), configured to receive an analog Ethernet signal over a physical Ethernet link while the Ethernet PHY transceiver is operating in a vehicle, and to convert the received analog Ethernet signal into a received digital signal; and
    a digital processor, configured to:
        hold one or more noise profiles that characterize respective predefined noise types of noise signals that are expected to corrupt the received analog Ethernet signal, wherein each of the noise profiles comprises a two-dimensional (2D) representation of a time-domain noise signal, the 2D representation comprising multiple frequency-domain vectors;
        generate from the received digital signal a sequence of 2D data structures, each comprising multiple frequency-domain vectors;
        classify an actual noise signal component present in the received digital signal into one of the noise types, using the noise profiles, by attempting to match the 2D data structures generated from the received digital signal to the 2D data structures of the noise profiles; and
        in response to deciding that the received digital signal includes the actual noise signal component that matches a given noise type among the predefined noise types, select a noise mitigation operation responsively to the given noise type, and apply the selected noise mitigation operation.

2. The automotive Ethernet PHY transceiver according to claim 1, wherein the actual noise signal component in the received digital signal comprises a transient noise signal, and wherein the digital processor is configured to detect an onset event of the transient noise signal, and to classify the transient noise signal in the received digital signal starting from the onset event.

3. The automotive Ethernet PHY transceiver according to claim 1, wherein, in response to deciding that the actual noise signal component matches the given noise type, the digital processor is configured to adjust the noise profile associated with the given noise type based on the actual noise signal component.

4. The automotive Ethernet PHY transceiver according to claim 1, wherein the digital processor is configured to measure a quality of the received digital signal, and to apply the noise mitigation operation by reconfiguring operation of one or both of the analog FE and the digital processor, based on the given noise type and on the measured quality.

5. The automotive Ethernet PHY transceiver according to claim 4, wherein the digital processor is configured to apply the noise mitigation operation by reconfiguring one or more of a frequency response of a filter, a gain parameter, and a clock rate, in one or both of the analog FE and the digital processor.

6. The automotive Ethernet PHY transceiver according to claim 1, wherein the digital processor is configured to classify the actual noise signal component by applying a machine-learning model to the sequence of the 2D data structures.

7. The automotive Ethernet PHY transceiver according to claim 1, wherein the digital processor is configured to specify, in the noise profiles, one or more characteristics selected from a list comprising: a source of the noise signal, a frequency pattern of the noise signal, time progression characteristics of the noise signal, and a signal strength of the noise signal.

8. The automotive Ethernet PHY transceiver according to claim 1, wherein the digital processor is configured to obtain one or more of the noise profiles directly from another vehicle, or by accessing a cloud storage that shares noise profiles of noise types among multiple vehicles.

9. The automotive Ethernet PHY transceiver according to claim 1, wherein the automotive Ethernet PHY transceiver belongs to a plurality of interconnected automotive Ethernet PHY transceivers in the vehicle, and wherein the digital processor is configured to hold a noise profile that is not used by at least another Ethernet PHY transceiver in the plurality of the automotive Ethernet PHY transceivers.

10. The automotive Ethernet PHY transceiver according to claim 1, wherein the analog FE is configured to receive, in the actual noise signal component, Electromagnetic Interference (EMI) caused by one or more of an electronic component of the vehicle, a mechanical component of the vehicle, an electro-mechanical component of the vehicle, and an electromagnetic radiation source external to the vehicle.

11. The automotive Ethernet PHY transceiver according to claim 1, wherein the digital processor is configured to, based at least on an expected decay attribute of the actual noise signal component determined from the noise type classification: i) apply the noise mitigation operation for a predetermined period of time, and ii) modify the noise mitigation operation during the predetermined period of time.

12. A method for communication, comprising:
in an automotive Ethernet physical-layer (PHY) transceiver,
receiving an analog Ethernet signal over a physical Ethernet link while the Ethernet PHY transceiver is operating in a vehicle, and converting the received analog Ethernet signal into a received digital signal;
holding one or more noise profiles that characterize respective predefined noise types of noise signals that are expected to corrupt the received analog Ethernet signal, wherein each of the noise profiles comprises a two-dimensional (2D) representation of a time-domain noise signal, the 2D representation comprising multiple frequency-domain vectors;
generating from the received digital signal a sequence of 2D data structures, each comprising multiple frequency-domain vectors;
classifying an actual noise signal present in the received digital signal into one of the noise types, using the noise profiles, by attempting to match the 2D data structures generated from the received digital signal to the 2D data structures of the noise profiles; and
in response to deciding that the received digital signal includes the actual noise signal component that matches a given noise type among the predefined noise types, selecting a noise mitigation operation responsively to the given noise type, and applying the selected noise mitigation operation.

13. The method for communication according to claim 12, wherein the actual noise signal component in the received digital signal comprises a transient noise signal, and wherein classifying the actual noise signal comprises detecting an onset event of the transient noise signal, and classifying the transient noise signal in the received digital signal starting from the onset event.

14. The method for communication according to claim 12, and comprising, in response to deciding that the actual noise signal component matches the given noise type, adjusting the noise profile associated with the given noise type based on the actual noise signal component.

15. The method for communication according to claim 12, wherein applying the noise mitigation operation comprises measuring a quality of the received digital signal, and applying the noise mitigation operation by reconfiguring operation of one or both of the analog FE and the digital processor, based on the given noise type and on the measured quality.

16. The method for communication according to claim 15, wherein applying the noise mitigation operation comprises reconfiguring one or more of a frequency response of a filter, a gain parameter, and a clock rate, in one or both of the analog FE and the digital processor.

17. The method for communication according to claim 12, wherein classifying the actual noise signal component comprises applying a machine-learning model to the sequence of the two-dimensional data structures.

18. The method for communication according to claim 12, wherein holding the noise profiles comprises specifying, in the noise profiles, one or more characteristics selected from a list comprising: a source of the noise signal, a frequency pattern of the noise signal, time progression characteristics of the noise signal, and a signal strength of the noise signal.

19. The method for communication according to claim 12, wherein holding the noise profiles comprises obtaining one or more of the noise profiles directly from another vehicle, or by accessing a cloud storage that shares noise profiles of noise types among multiple vehicles.

20. The method for communication according to claim 12, wherein the automotive Ethernet PHY transceiver belongs to a plurality of interconnected automotive Ethernet PHY transceivers in the vehicle, and wherein holding the noise profiles comprises holding a noise profile that is not used by at least another Ethernet PHY transceiver in the plurality of the automotive Ethernet PHY transceivers.

21. The method for communication according to claim 12, wherein receiving the analog Ethernet signal comprises receiving, in the actual noise signal component, Electromagnetic Interference (EMI) caused by one or more of an electronic component of the vehicle, a mechanical component of the vehicle, an electro-mechanical component of the vehicle, and an electromagnetic radiation source external to the vehicle.

22. The method for communication according to claim 12, and comprising, based at least on an expected decay attribute of the actual noise signal component determined from the noise type classification: i) applying the noise mitigation operation for a predetermined period of time, and ii) modifying the noise mitigation operation during the predetermined period of time.

23. The automotive Ethernet PHY transceiver according to claim 1, wherein the digital processor is configured to detect the actual noise signal component present in the received digital signal, and to classify the detected actual noise signal component into one of the noise types.

24. The method for communication according to claim 12, wherein classifying the actual noise signal component comprises detecting the actual noise signal component present in the received digital signal, and classifying the detected actual noise signal component into one of the noise types.

\* \* \* \* \*